(12) United States Patent
Yan et al.

(10) Patent No.: US 11,622,167 B2
(45) Date of Patent: Apr. 4, 2023

(54) LENS DRIVING DEVICE AND ELECTRONIC DEVICE

(71) Applicant: Changzhou AAC Raytech Optronics Co., Ltd., Changzhou (CN)

(72) Inventors: Feng Yan, Shenzhen (CN); Tianheng Ni, Shenzhen (CN); Limei Zhao, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/560,182

(22) Filed: Dec. 22, 2021

(65) Prior Publication Data

US 2022/0413253 A1 Dec. 29, 2022

(30) Foreign Application Priority Data

Jun. 28, 2021 (CN) .......................... 202110719696.3

(51) Int. Cl.
| | |
|---|---|
| *H04N 5/225* | (2006.01) |
| *H04N 5/232* | (2006.01) |
| *G03B 5/00* | (2021.01) |
| *H04N 23/54* | (2023.01) |
| *H04N 23/57* | (2023.01) |
| *H04N 23/55* | (2023.01) |
| *G02B 27/64* | (2006.01) |
| *H04N 23/68* | (2023.01) |

(52) U.S. Cl.
CPC ........... *H04N 23/54* (2023.01); *G02B 27/646* (2013.01); *H04N 23/55* (2023.01); *H04N 23/57* (2023.01); *H04N 23/685* (2023.01); *H04N 23/687* (2023.01)

(58) Field of Classification Search
CPC ........ H04N 23/50; H04N 23/51; H04N 23/54; H04N 23/55; H04N 23/57; H04N 23/58; H04N 23/68–689; G02B 27/646; G02B 2205/00–0023; G02B 2205/0053; G02B 2205/0069; G03B 5/00; G03B 5/0206
USPC .......................... 348/208.7, 208.11, 373–376
See application file for complete search history.

(56) References Cited

U.S. PATENT DOCUMENTS

2021/0405321 A1* 12/2021 Kwon .................... G03B 30/00

FOREIGN PATENT DOCUMENTS

| CN | 113014779 A | * | 6/2021 | ........... H04N 5/2253 |
| KR | 10-20210077656 A | * | 6/2021 | ............... G03B 5/04 |

\* cited by examiner

*Primary Examiner* — Anthony J Daniels
(74) *Attorney, Agent, or Firm* — W&G Law Group

(57) ABSTRACT

The present invention provides a lens driving device and an electronic device, wherein the lens driving device comprises a housing and a lens assembly; the lens assembly includes a lens module and a shell for accommodating the lens module; a bottom wall of the housing is formed an arc-shaped rail; the lens driving device further includes a ball disposed between the housing and the shell and located in the arc-shaped rail; a first driving structure for driving the lens assembly to rotate around an optical axis is further arranged between the housing and the shell; and the first driving structure includes a magnet and a coil opposite to the magnet. The present invention realizes rotation of the lens module around the optical axis direction, thus avoiding the swaying of the lens driving device caused by hand movement, achieving image stabilization, and improving the imaging effect of the lens module.

18 Claims, 11 Drawing Sheets

LENS DRIVING DEVICE AND ELECTRONIC DEVICE

TECHNICAL FIELD

The present invention relates to the technical field of optical imaging, in particular to a lens driving device and an electronic device.

BACKGROUND

In recent years, with the development of optical imaging technology and the emergence of electronic products with imaging functions, optical lenses have been widely used in various electronic products. Generally, light enters directly from an object side, straightly passes through a lens assembly along an optical axis to an image side, and images an object through the lens assembly. The lens assembly generally has an autofocus function and an optical image stabilization function.

However, when a user holds an electronic device and takes photos, a lens driving device with the optical image stabilization function cannot avoid the swaying of the lens driving device due to the shaking of hands, which will cause the optical axis of the lens to continuously deviate, resulting in poor imaging effect.

Therefore, it is necessary to provide an improved lens driving device to solve the above-mentioned problems.

SUMMARY

The present invention aims to provide a lens driving device capable of rotating around an optical axis direction, and an electronic device.

The technical solution of the present invention is as follows: the present invention provides a lens driving device, wherein the lens driving device comprises a housing having an accommodating space and a lens assembly accommodated in the housing; the lens assembly comprises a lens module and a shell for accommodating the lens module; the shell is connected with the housing through a clip; an inner surface of a bottom wall of the housing is provided with a first protrusion; an outer surface of a bottom wall of the shell is provided with a second protrusion; the first protrusion and the second protrusion form an arc-shaped rail; the lens driving device further comprises a ball disposed between the housing and the shell and located in the arc-shaped rail; a first driving structure for driving the lens assembly to rotate around an optical axis is further arranged between the housing and the shell; and the first driving structure comprises a magnet and a coil opposite to the magnet.

The first driving structure driving part comprises a flexible printed circuit, a coil, and a magnet which are superposed in sequence in a direction perpendicular to the optical axis; the coil is arranged on a surface of the flexible printed circuit away from the housing; the flexible printed circuit is configured for providing a current for the coil; the magnet directly faces a surface of the coil away from the flexible printed circuit; an electromagnetic acting force is generated between the magnet and the coil so that the lens assembly rotates around the optical axis direction thereof.

Preferably, at least four balls are provided, and at least four arc-shaped rails are provided; each ball is located in one arc-shaped rail; and the ball can roll in the arc-shaped rail.

Preferably, the magnet is fixedly arranged on the shell; the magnet at least comprises a first magnet, a second magnet, and a third magnet which are arranged in sequence in the direction perpendicular to the optical axis; the first magnet, the second magnet, and the third magnet are magnetized along a horizontal direction; the magnetizing direction of the first magnet is opposite to the magnetizing direction of the second magnet; the magnetizing direction of the second magnet is opposite to the magnetizing direction of the third magnet; the coil comprises a first coil opposite to the first magnet, a second coil opposite to the second magnet, and a third coil opposite to the third magnet; a current direction of the first coil is opposite to the current direction of the second coil; and the current direction of the second coil is opposite to the current direction of the third coil.

Preferably, a thickness direction of a winding of the first coil, the thickness direction of the winding of the second coil, and the thickness direction of the winding of the third coil are all perpendicular to the horizontal direction; the thickness of the first coil, the thickness of the second coil, and the thickness of the third coil are the same; a long axis direction of the first coil, the long axis direction of the second coil, and the long axis direction of the third coil are all parallel to the optical axis direction.

Preferably, the lens module comprises a lens block and a support framework arranged around the lens block; the lens driving device further comprises an elastic bracket that connects the lens module with the shell, and a second driving structure arranged between the support framework and the shell; the elastic bracket comprises four (two pairs of) elastic arms; one pair of elastic arms are connected with the shell on a first diagonal, and the other pair of elastic arms are connected with the support framework on a second diagonal; the second driving structure comprises a first driving part located on one side edge of the support framework and a second driving part located on an adjacent side edge of the support framework; the first driving part and the second driving part are located on two sides of the second diagonal; the first driving part and the second driving part provide drive forces in the same direction so that the lens module move towards a first direction; and the first driving part and the second driving part provide drive forces in different directions so that the lens module move towards a second direction.

Preferably, the lens bracket comprises a first side wall and a second side wall that are adjacently disposed; the first driving part comprises a first flipping magnet fixedly disposed on the first side wall and a second flipping magnet disposed on the second side wall, a first flipping coil opposite to the first flipping magnet, and a second flipping coil opposite to the second flipping magnet.

Preferably, the side wall of the shell is provided with at least three grooves, and the magnets are accommodated in the grooves.

Preferably, in a third direction perpendicular to the horizontal direction, the thickness of the magnet is less than or equal to the depth of the groove.

In addition, the present invention further provides an electronic device with the above-mentioned lens driving device.

The beneficial effects of the present invention are as follows: the lens driving device of the present invention can realize that the lens module rotates around the optical axis direction through the electromagnetic action between the magnets and the coils which are fixedly arranged on the support framework, and realize adjustment of the deflection of the optical axis of the lens. The balls are arranged on a base and can guide the rotation of the lens module, which speeds up the rotation of the lens module around the optical axis and avoids the swaying of the lens driving device caused by hand movement, thereby achieving image stabilization and improving the imaging effect of the lens module.

DETAILED DESCRIPTION OF THE EMBODIMENTS

The present invention is further described below in combination with the accompanying drawings and embodiments.

Figure 1:
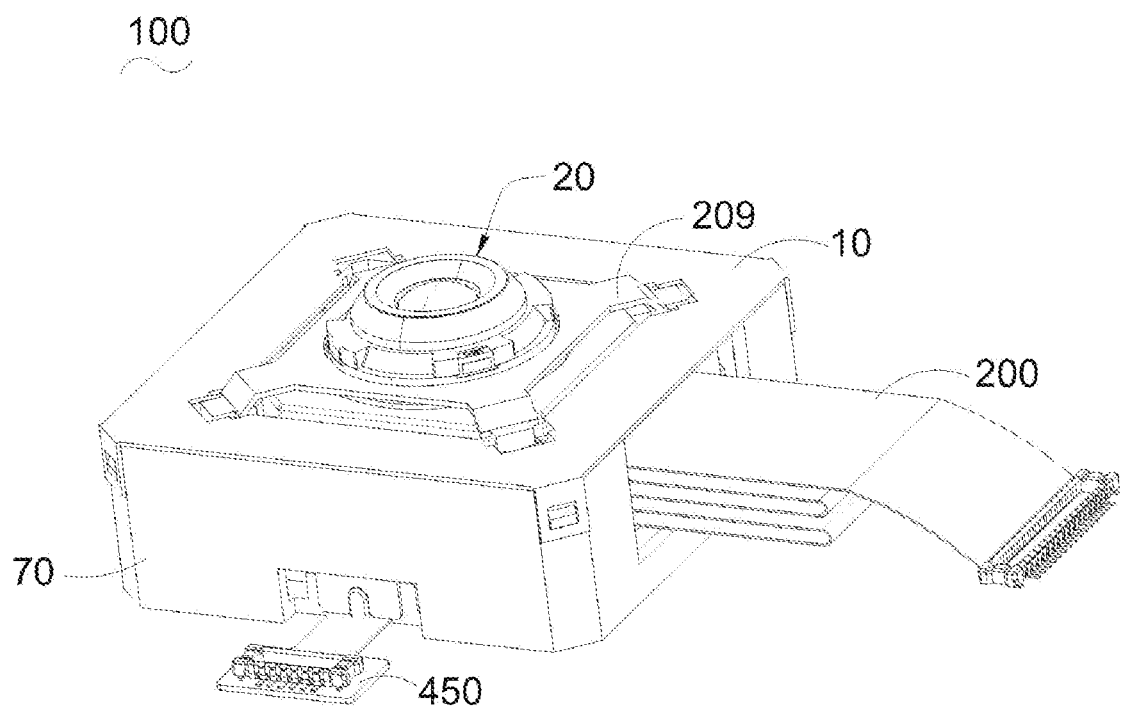
FIG. 1 is a schematic structural diagram of a lens driving device provided by the present invention.
Figure 2:
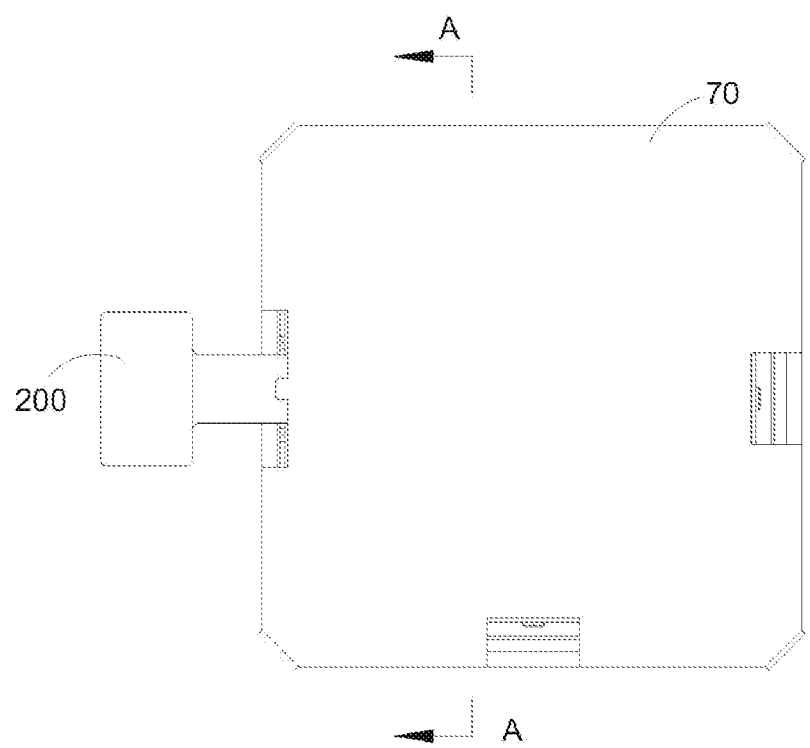
FIG. 2 is a schematic structural diagram of a lens driving device provided by the present invention from another view.
Figure 3:
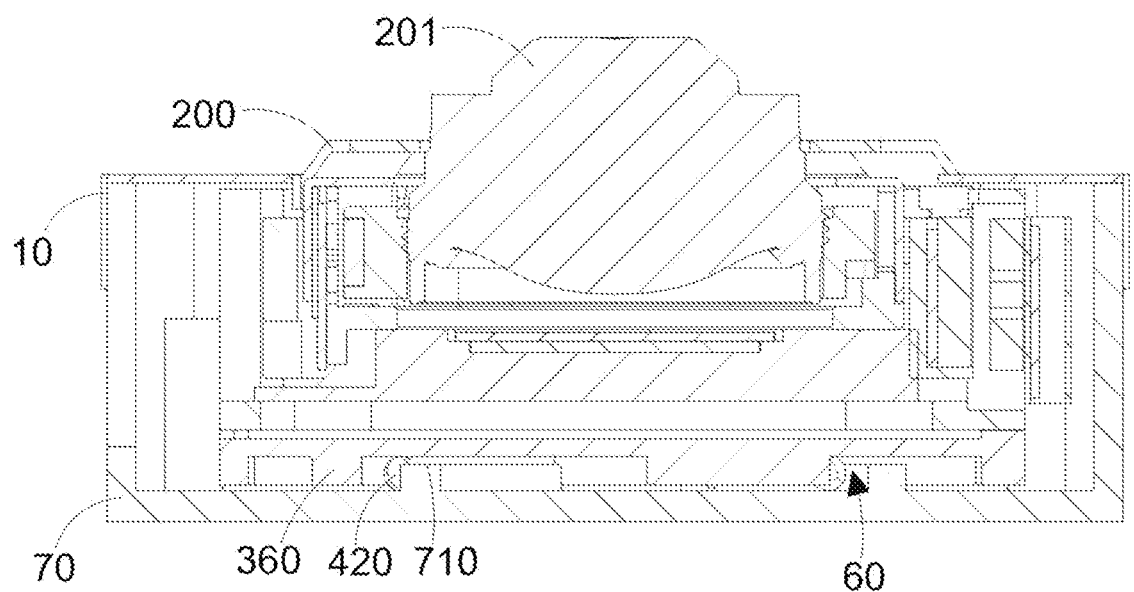
FIG. 3 is a schematic sectional diagram of the lens driving device shown in FIG. 2 along the direction A-A.
Figure 4:
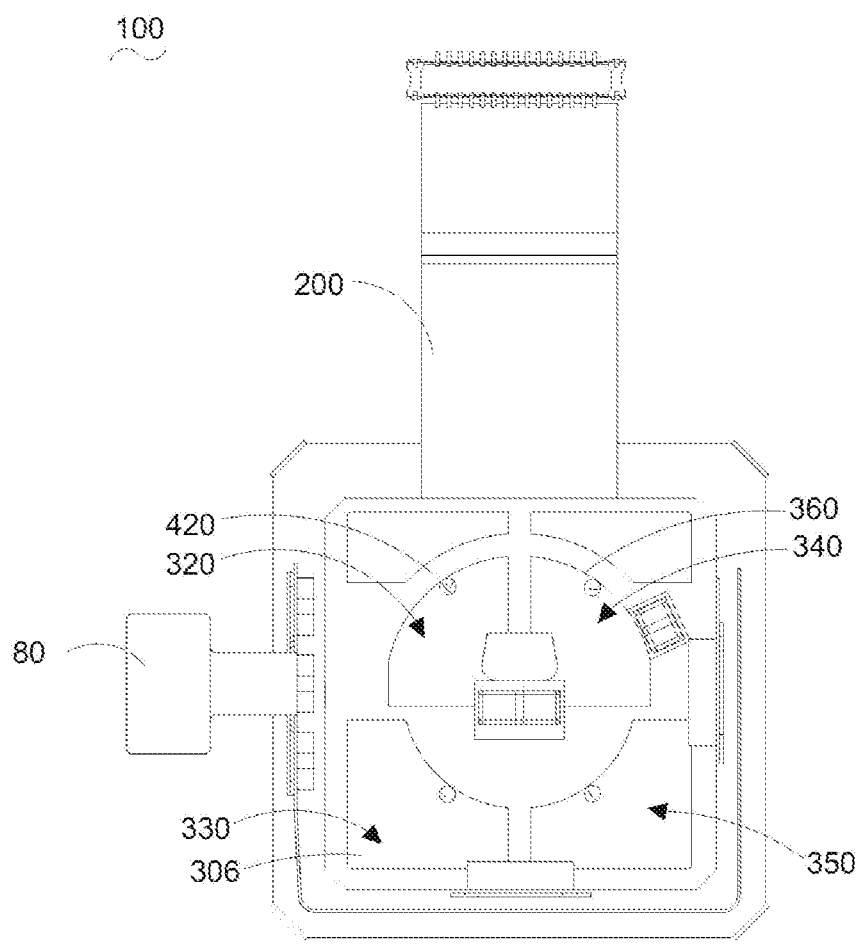
FIG. 4 is a schematic structural diagram of the lens driving device shown in FIG. 1 after a housing is removed.
Figure 5:
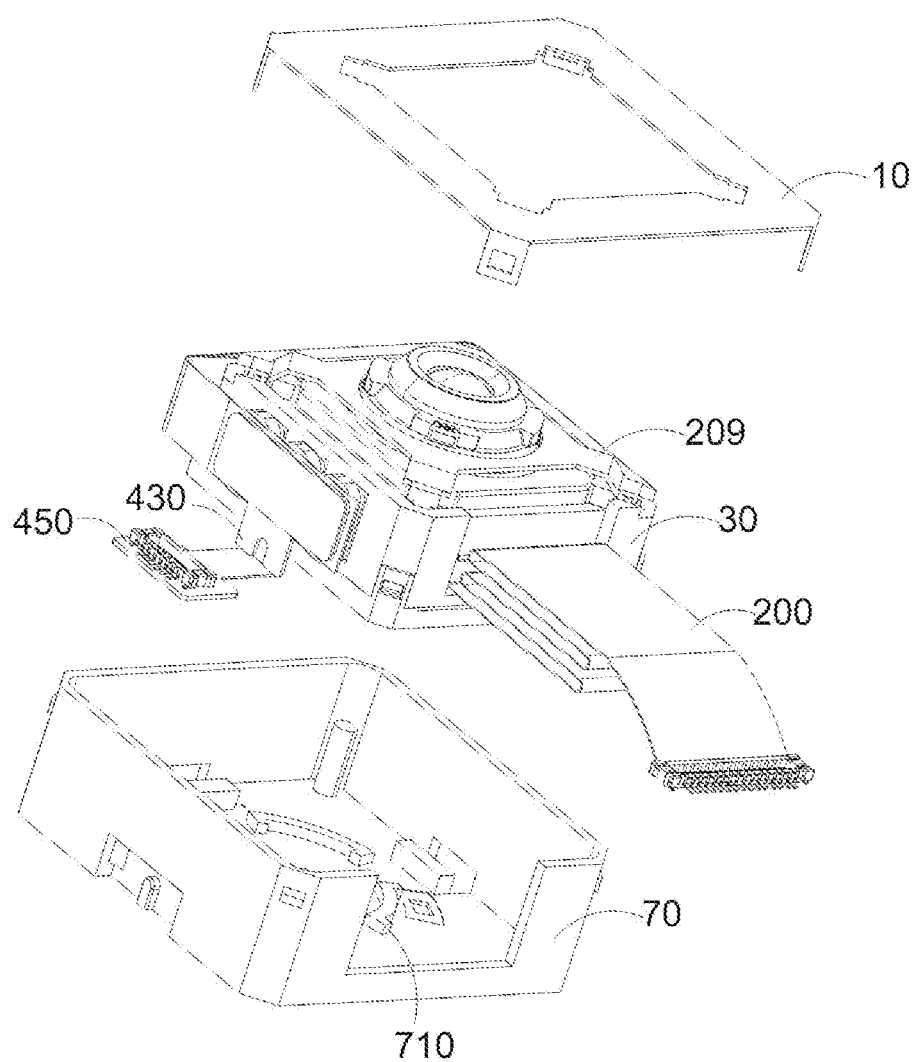
FIG. 5 is a schematic structural diagram of removal of a first bracket and a housing from the lens driving device shown in FIG. 1.
Figure 6:
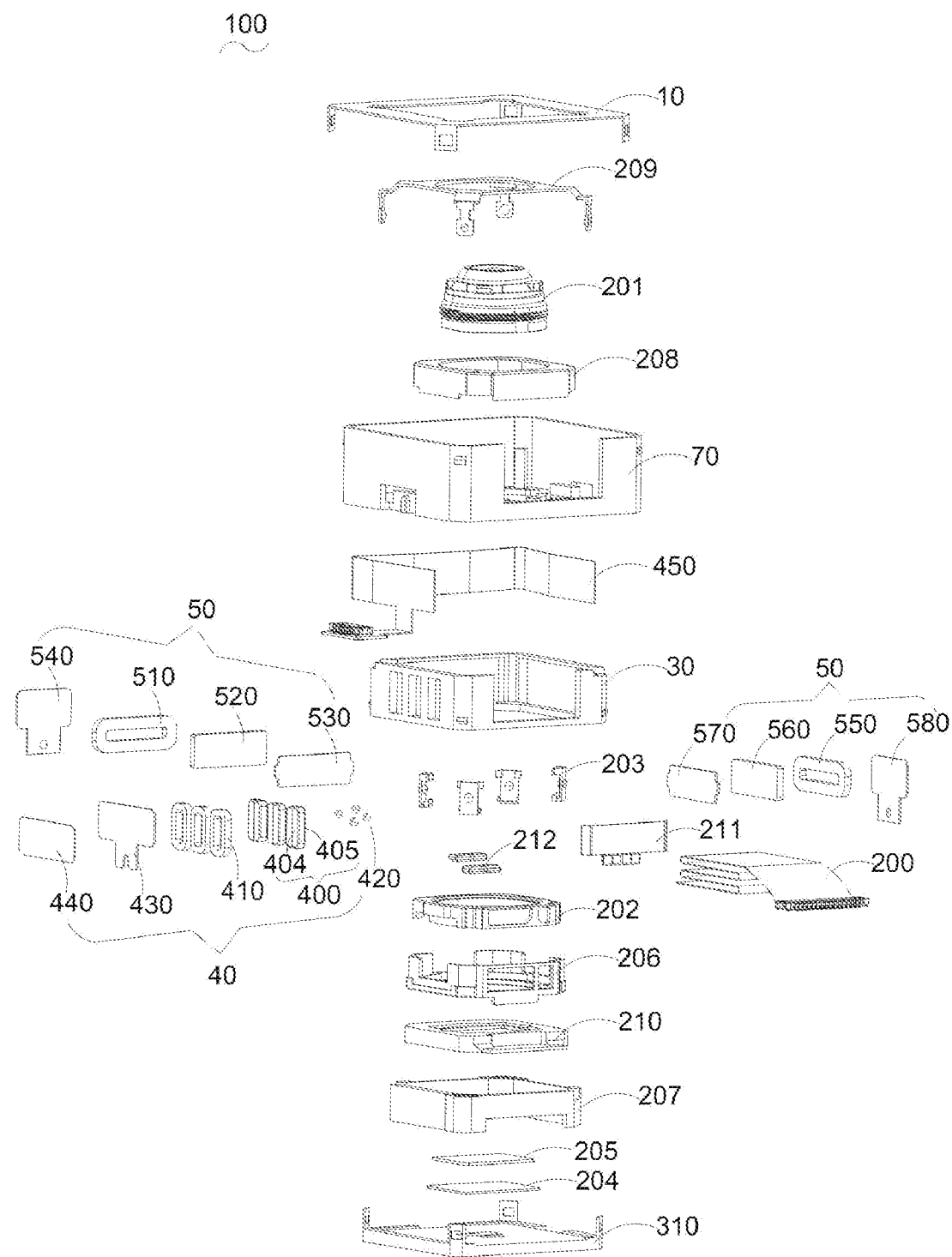
FIG. 6 is a schematic diagram of an exploded structure of the lens driving device shown in FIG. 1.

Referring to FIG. 1 to FIG. 6, FIG. 1 is a schematic structural diagram of a lens driving device provided by the present invention; FIG. 2 is a schematic structural diagram of a lens driving device provided by the present invention from another view; FIG. 3 is a schematic sectional diagram of the lens driving device shown in FIG. 2 along the direction A-A; FIG. 4 is a schematic structural diagram of the lens driving device shown in FIG. 1 without the housing; FIG. 5 is a schematic structural diagram of removal of a first bracket and a housing from the lens driving device shown in FIG. 1; and FIG. 6 is a schematic diagram of an exploded structure of the lens driving device shown in FIG. 1. The present invention provides a lens driving device 100 including a housing 70 having an accommodating space and a lens assembly accommodated in the housing 70; the lens assembly includes a lens module 20, a shell 30 for accommodating the lens module 20, and a first driving structure 40; and the lens module 20 is suspended in the shell 30. The housing 70 has the accommodating space and includes a first bracket 10. The shell 30 is connected with the first bracket 10 of the housing 70 through a clip. The first driving structure 40 for driving the lens module 20 to rotate around an optical axis is also arranged between the housing 70 and the shell 30. The first driving structure 40 includes a magnet 400 and a coil 410 opposite to the magnet. The inner surface of a bottom wall of the housing 70 is provided with a first protrusion 710. The shell 30 includes an outer bracket 310 arranged on one side away from the lens module 20. The outer surface of a bottom wall 306 of the outer bracket 310 is provided with a second protrusion 360. The first protrusion 710 and the second protrusion 360 form an arc-shaped rail 60. The lens driving device 100 further includes a ball 420 arranged between the housing 70 and the shell 30 and located in the arc-shaped rail 60.

It should be noted that the number of the first protrusions 710 is at least four, and the number of the second protrusions 360 corresponding to the first protrusions is at least four. It can be appreciated that each first protrusion 710 and each second protrusion 360 have a one-to-one correspondence and form the arc-shaped rail 60. That is, there are at least four arc-shaped rails 60 formed by the first protrusions 710 and the second protrusions 360.

It should be noted that there are at least four balls 420, and at least one ball 420 is located in each arc-shaped rail 60. The ball 420 arranged in the arc-shaped rail 60 is configured for guiding the lens module 20 to rotate around the optical axis direction, The ball 420 cooperates with the magnet 400 fixedly arranged on the shell 30 and the coil 410 arranged on the housing 70 and opposite to the magnet 400. The electromagnetic action between the magnet 400 and the coil 410 can speed up the rotation of the lens module 20 around the optical axis direction of the lens module 20, thereby achieving image stabilization and enhancing the imaging effect of the lens module 20.

Please refer to FIG. 4, the outer surface of the bottom wall 306 and the second protrusions 360 form rotatable support frameworks for accommodating the balls 420. Each ball 420 is located in one rotatable support framework and can roll along an arc slot. At least a part of each second protrusion 360 is a circular arc, and the depth of the rotatable support framework is less than the diameter of each ball 420, so that the ball 420 can roll in the rotatable support framework, thereby realizing adjustment of the deflection of the optical axis of the lens.

It should be noted that the shell 30 includes at least four rotatable support frameworks. For example, the shell 30 may include a first rotatable support framework 320, a second rotatable support framework 330, a third rotatable support framework 340, and a fourth rotatable support framework 350. The first rotatable support framework 320 and the second rotatable support framework 330 are symmetrical in a horizontal direction, and the third rotatable support framework 340 and the fourth rotatable support framework 350 are symmetrically arranged in the horizontal direction. The arrangement of the arc sections on the rotatable support frameworks can make friction forces between the balls 420 and the rotatable support frameworks less, so that the balls 420 can better roll in the rotatable support frameworks, and the lens module 20 can be more efficiently adjusted. The symmetrical arrangement of the rotatable support frameworks are more convenient for the mounting of the rotatable support frameworks.

Figure 7:
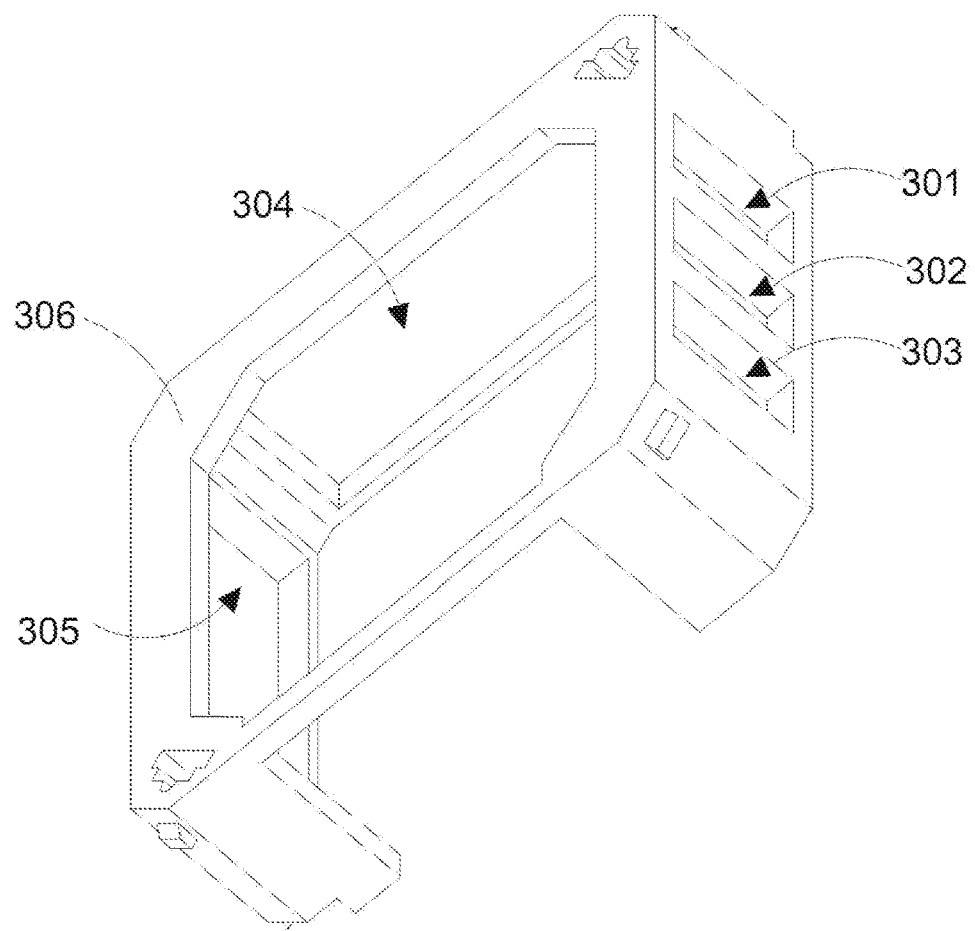
FIG. 7 is a partially schematic structural diagram of a shell in the lens driving device shown in FIG. 1.
Figure 8:
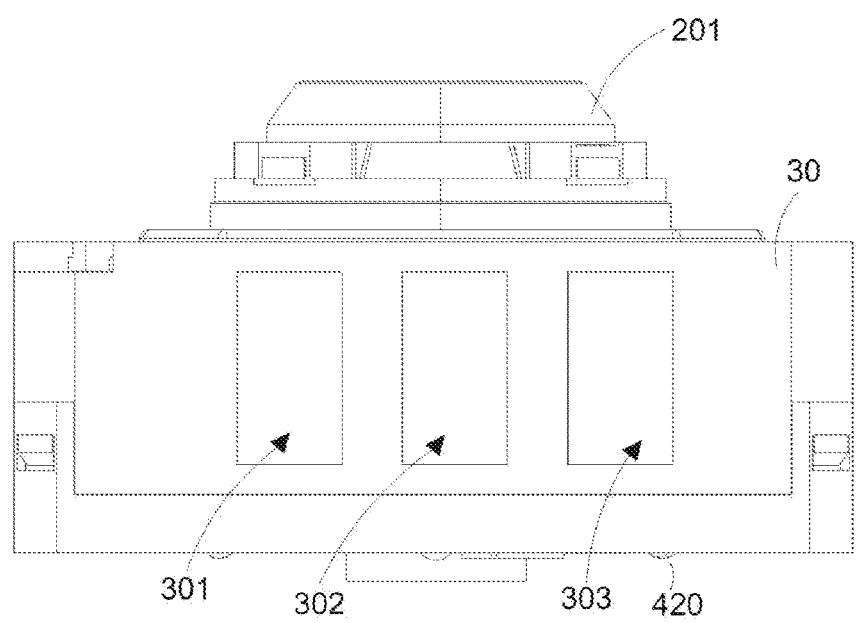
FIG. 8 is a partially schematic structural diagram of the shell in the lens driving device shown in FIG. 1 from another view.

Referring to FIG. 7 and FIG. 8, FIG. 7 is a partially schematic structural diagram of a shell in the lens driving device shown in FIG. 1, and FIG. 8 is a partially schematic structural diagram of the shell in the lens driving device shown in FIG. 1 from another view. The shell 30 is located in the housing 70 and forms the accommodating space together with the housing 70. The shell 30 includes the bottom wall 306 and side walls surrounding a peripheral edge of the bottom wall 306 extending from the bottom wall 306 towards a direction close to the lens module 20. The bottom wall 306 and the side walls form the shell 30 with the accommodating space. An accommodating hole for accommodating the lens module 20 is formed in a center of the shell 30. The side walls of the shell 30 include a first side wall, a second side wall, and a third side wall. The first side wall is provided with a first mounting slot 304, and the second side wall is provided with a second mounting slot 305. In a direction perpendicular to the optical axis, the third side wall is provided with grooves formed by sinking towards one side close to the lens module 20. The grooves at least include a first groove 301, a second groove 302, and a third groove 303 that are sequentially arranged in the direction perpendicular to the optical axis, and the depth of the first groove 301, the depth of the second groove 302, and the depth of the third groove 303 are all the same. It should be noted that the number of the grooves is greater than or equal to three.

Figure 9:
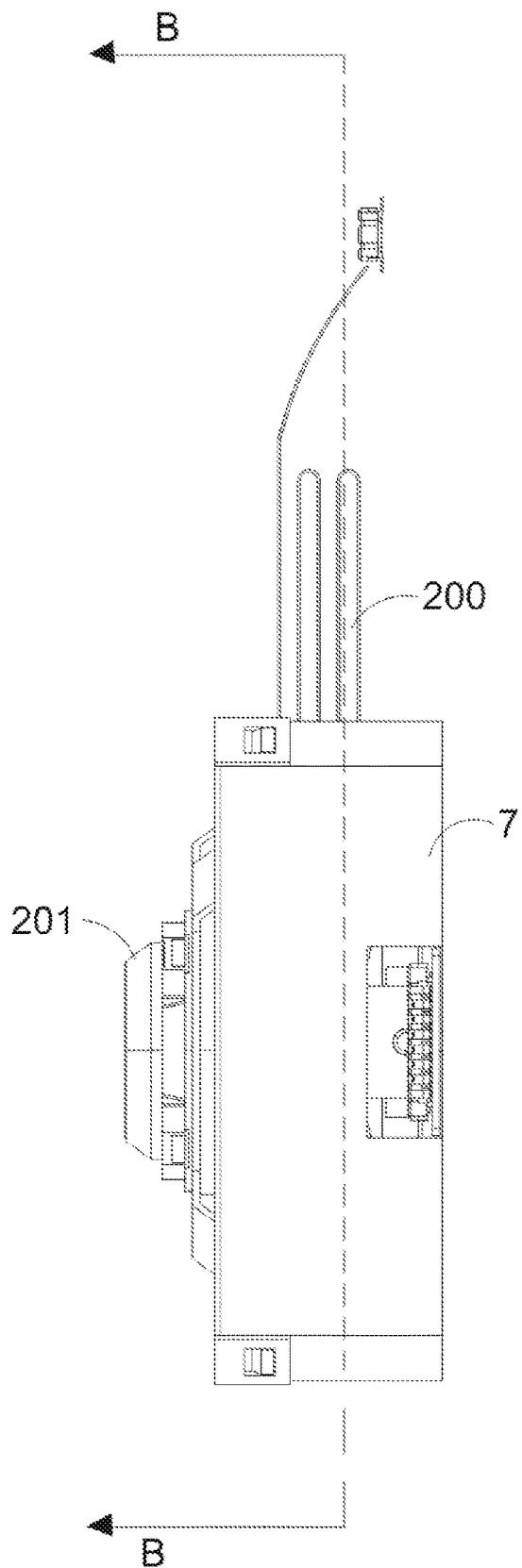
FIG. 9 is a schematic structural diagram of the lens driving device shown in FIG. 1 from another view.
Figure 10:
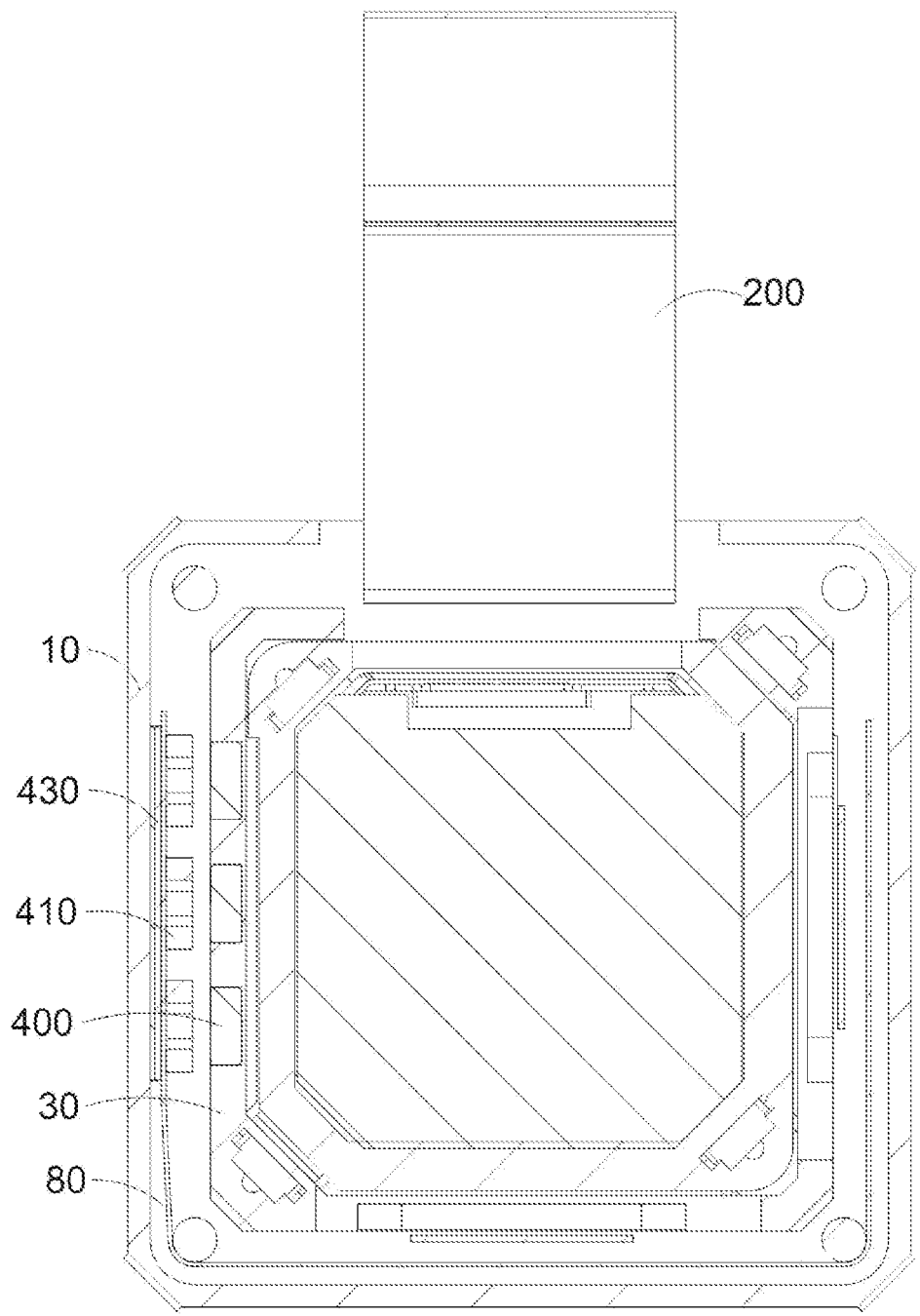
FIG. 10 is a schematic sectional diagram of the lens driving device shown in FIG. 7 along the direction B-B.
Figure 11:
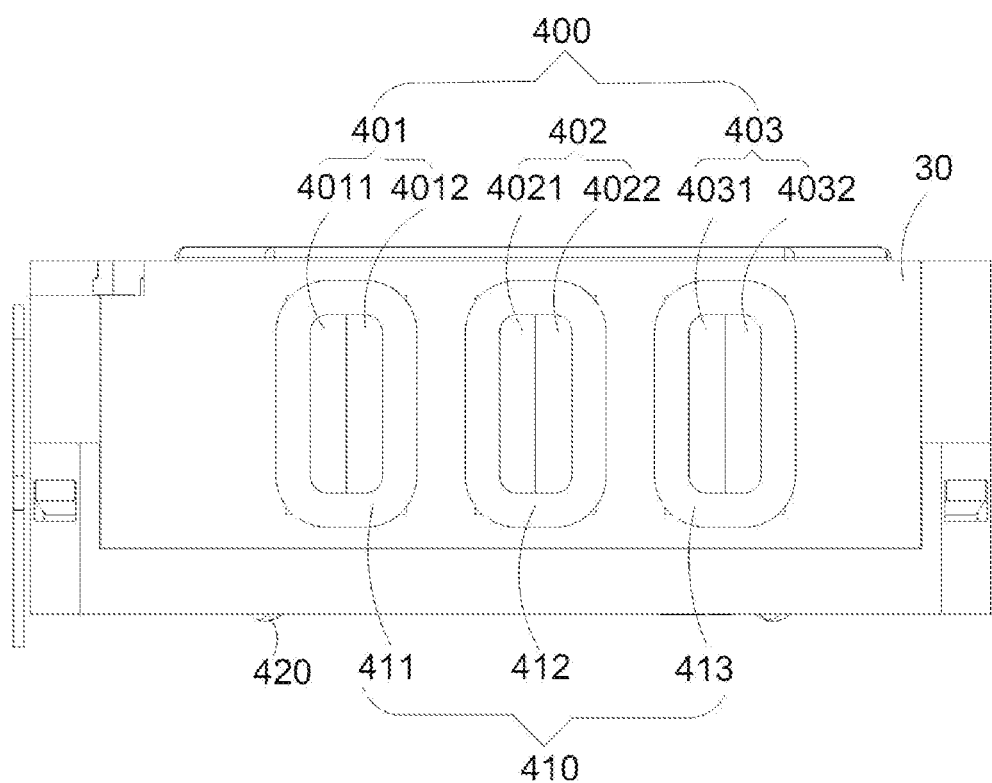
FIG. 11 is a schematic structural diagram of coils and magnets in the lens driving device shown in FIG. 1.
Figure 12:
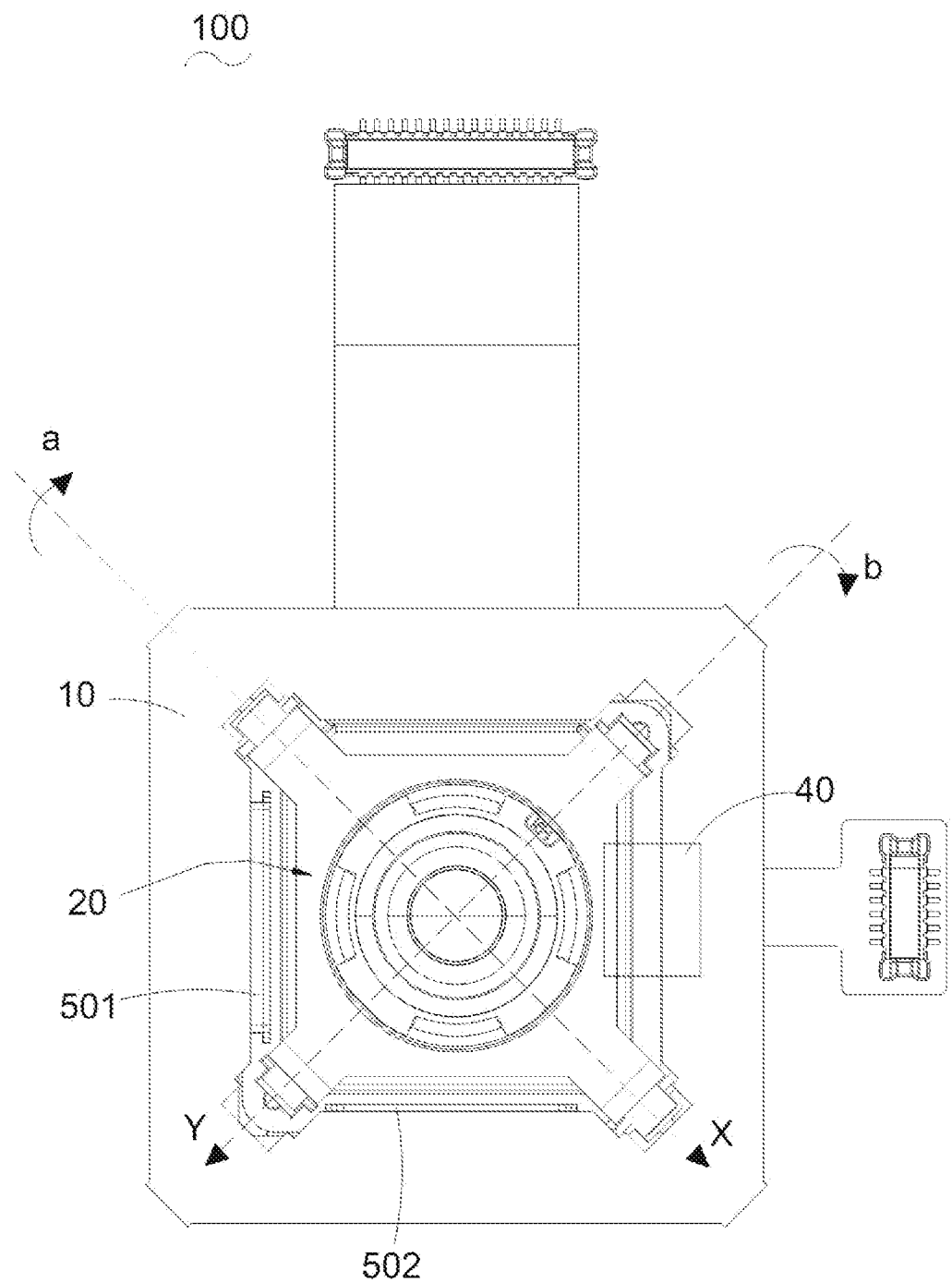
FIG. 12 is a top view of a lens driving device provided by the present invention.

Referring to FIG. 9 to FIG. 11, FIG. 9 is a schematic structural diagram of the lens driving device shown in FIG. 1 from another view; FIG. 10 is a schematic sectional diagram of the lens driving device shown in FIG. 4 along the direction B-B; and FIG. 11 is a schematic structural diagram of coils and magnets in the lens driving device shown in FIG. 1 The first driving structure 40 includes a flexible substrate 430, a flexible printed circuit 450, a coil 410, and a magnet 400 that are sequentially superposed in the direction perpendicular to the optical axis. The flexible substrate 430 is adhered to a side wall of the housing 70 through gum 440; the flexible printed circuit 450 is fitted to a surface of the flexible substrate 430 away from the housing 70; the coil 410 is arranged on a surface of the flexible printed circuit 450 away from the flexible substrate 430; the flexible printed circuit 450 is electrically connected with the coil 410 and configured for providing a current for the coil 410. The magnet 400 directly faces a surface of the coil 410 away from the flexible substrate 430. An electromagnetic acting force is generated between the magnet 400 and the coil 410 to cause the lens module 20 to rotate around the optical axis direction of the lens module 20.

The magnet 400 includes a first part and a second part which are arranged in sequence in the direction perpendicular to the optical axis. The magnetizing direction can be from the first part to the second part, or from the second part to the first part. All the magnetizing directions are horizontal. The magnet 400 has an inner surface 405 close to the lens module 20 and an outer surface 404 away from the lens module 20. The first part and the second part of the magnet 400 are one piece formed by an entire piece of magnet 400 that magnetizes different parts. The shape, size and thickness of the first part of the magnet 400 are the same as the shape, size and thickness of the second part. The magnet 400 is fixedly mounted on the grooves of the shell 30. In particular, the magnetic 400 can be attached in the grooves by means of gluing, etc., which can reduce the space occupied by the magnet 400 and make the mounting more convenient. It should be noted that the thickness of the magnet 400 corresponds to the depth of the groove. For example, the thickness of the magnet 400 is equal to the depth of the groove, that is, an outer surface 404 of the magnet 400 is flush with a surface of the third side wall away from the lens module 20. Or, the thickness of the magnet 400 is less than the thickness of the groove.

The magnet 400 at least includes a first magnet 401, a second magnet 402, and a third magnet 403 which are arranged in the horizontal direction. The first magnet 401 and the third magnet 403 are arranged on both sides of the second magnet 402. The magnetizing direction of the first part 4011 of the first magnet 401 in the horizontal direction is opposite to the magnetizing direction of the first part 4021 of the second magnet 402 in the horizontal direction, and the magnetizing direction of the first part 4021 of the second magnet 402 in the horizontal direction is opposite to the magnetizing direction of the first part 4031 of the third magnet 403 in the horizontal direction. The magnetizing direction of the second part 4012 of the first magnet 401 in the horizontal direction is opposite to the magnetizing direction of the second part 4022 of the second magnet 402 in the horizontal direction, and the magnetizing direction of the second part 4022 of the second magnet 402 in the horizontal direction is opposite to the magnetizing direction of the second part 4032 of the third magnet 403 in the horizontal direction. The magnetizing direction of the first part 4011 of the first magnet 401 in a third direction is opposite to the magnetizing direction of the second part 4012 of the first magnet 401 in the horizontal direction; the magnetizing direction of the first part 4021 of the second magnet 402 in the horizontal direction is opposite to the magnetizing direction of the second part 4022 of the second magnet 402 in the horizontal direction; and the magnetizing direction of the first part 4031 of the third magnet 403 in the horizontal direction is opposite to the magnetizing direction of the second part 4032 of the third magnet 403 in the horizontal direction.

The coil 410 is disposed on the housing 70 and is electrically connected to the flexible printed circuit 450 to supply power to the coil 410. In some embodiments, the coil 410 is attached to the flexible printed circuit 450, which can save the mounting space and make the entire lens driving device 100 smaller in volume. A surface of the coil 410 close to the lens module 20 directly faces the outer surface 404 of the magnet 400. In particular, the coil 410 includes a first coil 411 directly facing the outer surface 404 of the first magnet 401, a second coil 412 directly facing the outer surface 404 of the second magnet 402, and a third coil 413 directly facing the outer surface 404 of the third magnet 403. A thickness direction of a winding of the first coil 411, the thickness direction of the winding of the second coil 412, and the thickness direction of the winding of the third coil 413 are all perpendicular to the third direction W; and the third direction W is perpendicular to the horizontal direction. Furthermore, the thickness of the first coil 411, the thickness of the second coil 412, and the thickness of the third coil 413 are the same; and a long axis direction of the first coil 411, the long axis direction of the second coil 412, and the long axis direction of the third coil 413 are all parallel to the optical axis direction. In some embodiments, a projected area of the first coil 411 on the third side wall is larger than that of the first magnet 401 on the third side wall; the projected area of the second coil 412 on the third side wall is larger than that of the second magnet 402 on the third side wall; the projected area of the third coil 413 on the third side wall is larger than that of the third magnet 403 on the third side wall; and the projected areas of the first coil 411, the second coil 412, and the third coil 413 on the third side wall are the same.

The flexible printed circuit 450 supplies different currents to the first coil 411, the second coil 412, and the third coil 413, respectively. In particular, a current direction of the first coil 411 is opposite to the current direction of the second coil 412, and the current direction of the second coil 412 is opposite to the current direction of the third coil 413. The energized first coil 411 is located in a magnetic field generated by the first magnet 401. A first electromagnetic acting force is generated between the first magnet 401 and the first coil 411. According to the left-hand judgment rule, the first electromagnetic acting force is perpendicular to the optical axis direction of the lens module 20. The second coil 412 is located in a magnetic field generated by the second magnet 402. A second electromagnetic acting force is generated between the second magnet 402 and the second coil 412. According to the left-hand judgment rule, the second electromagnetic acting force is perpendicular to the optical axis direction of the lens module 20. The third coil 413 is located in a magnetic field generated by the third magnet 403. A third electromagnetic acting force is generated between the third magnet 403 and the third coil 413. According to the left-hand judgment rule, the third electromagnetic acting force is perpendicular to the optical axis direction of the lens module 20. The direction of the first electromagnetic acting force, the direction of the second electromagnetic acting force, and the direction of the third electromagnetic acting force are the same. Under the superposition of the first electromagnetic acting force, the second electromagnetic acting force, and the third electromagnetic acting force, the lens module 20 can rotate around the optical axis direction, thus adjusting the deflection of the lens module 20 due to swaying, achieving image stabilization, and enhancing the imaging effect of the lens module 20.

It should be noted that in some embodiments, a plurality of first coils 411 and a plurality of second coils 412, as well as first magnets 401 directly facing the first coils 411 and second magnets 402 directly facing the second coils 412 may be provided in the lens driving device. It is only necessary to ensure that the first coil 411 and the second coil 412 are arranged crosswise and in sequence, so that the direction of the electromagnetic acting force generated during energization is consistent. This magnetic field distribution method can increase the electromagnetic acting force of the coil without adding module materials and increasing the assembling cost, and can also reduce changes in a drive force in the rotating process, improve the drive linearity, and make the image stabilization effect better.

In specific applications, in case of unstable photographing, the lens module 20 may have a little movement. At this time, the electromagnetic acting force generated by cooperation of the coil 410 and the magnet 400 drives the lens module 20 to move in an opposite direction to compensate the movement, thus acquiring a high-definition image.

Figure 13:
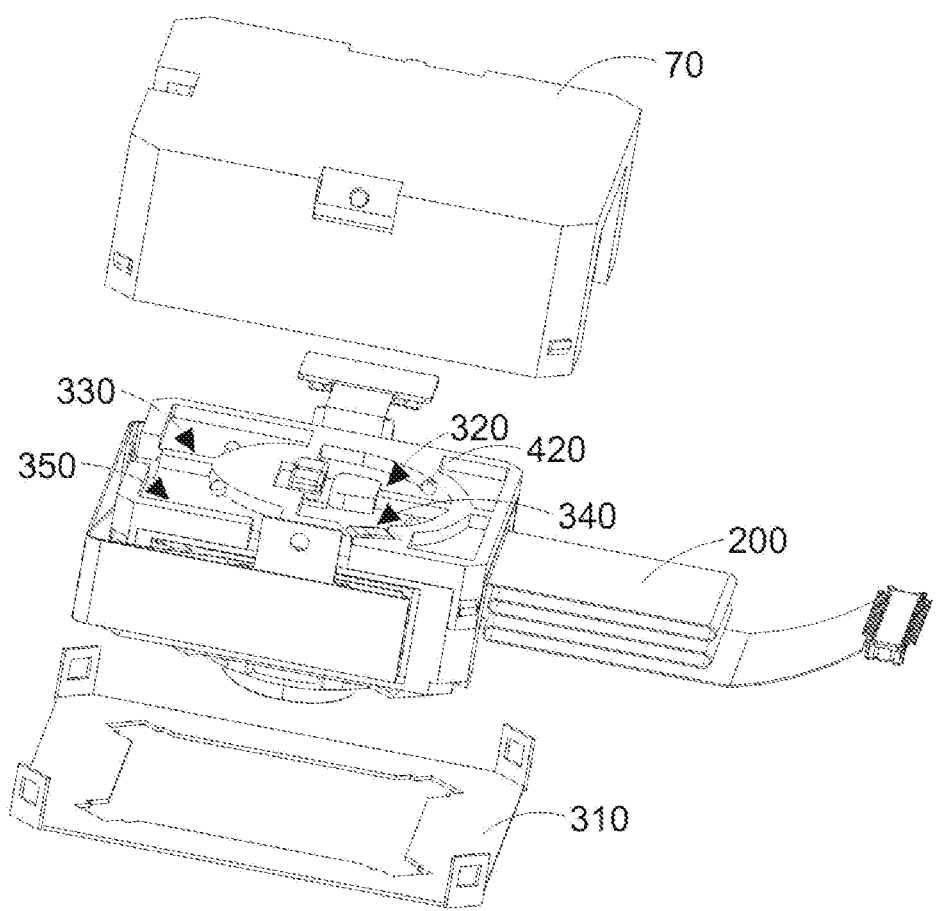
FIG. 13 is a schematic structural diagram of the lens driving device shown in FIG. 3 from another view.
Figure 14:
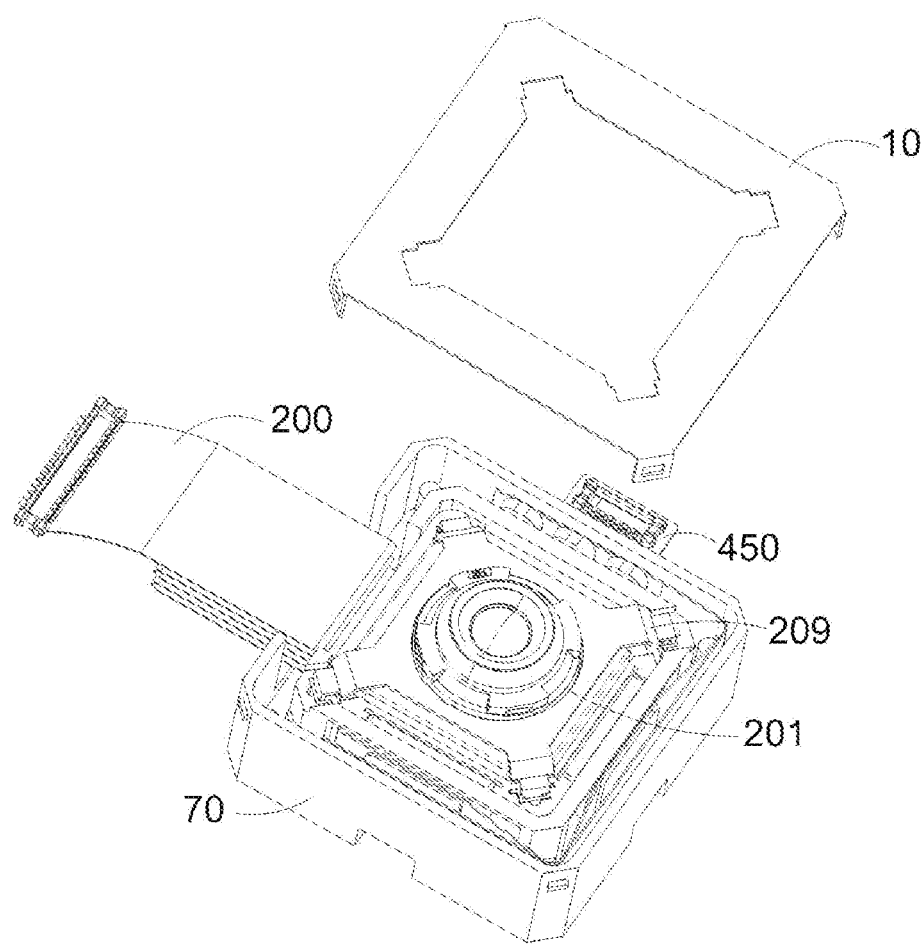
FIG. 14 is a schematic structural diagram of removal of a first bracket from the lens driving device shown in FIG. 12.
Figure 15:
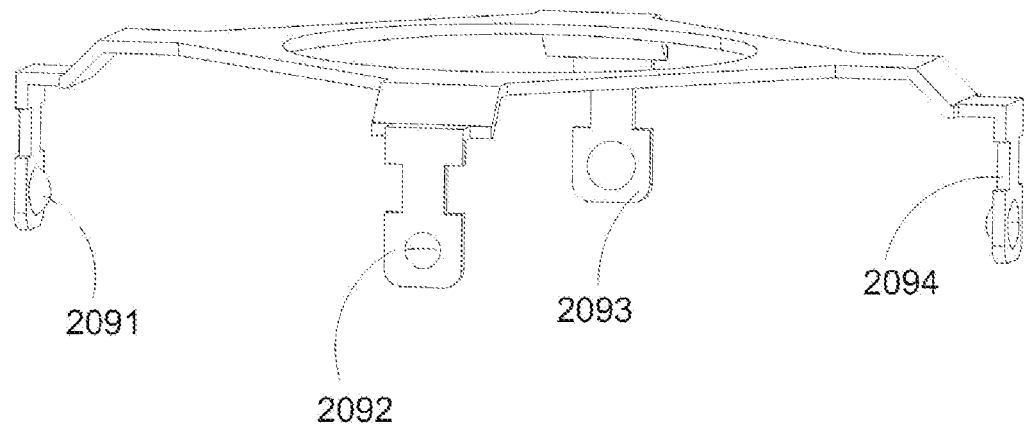
FIG. 15 is a schematic structural diagram of an elastic bracket in the lens driving device shown in FIG. 12.

Referring to FIG. 12 to FIG. 15, FIG. 12 is a top view of a lens driving device provided by the present invention; FIG. 13 is a schematic structural diagram of the lens driving device shown in FIG. 3 from another view; FIG. 14 is a schematic structural diagram of removal of a first bracket from the lens driving device shown in FIG. 12; and FIG. 15 is a schematic structural diagram of an elastic bracket in the lens driving device shown in FIG. 12.

The flexible printed circuit 450 includes a first section, a second section, and a third section that are sequentially connected. The first section is disposed in a first gap formed between the first side wall and the housing 70, the second section is disposed in a second gap formed between the second side wall and the housing 70, and the third section is disposed in a third gap formed between the third side wall and the housing 70. The coil 410 in the first driving structure 40 is attached to the third section of the flexible printed circuit 450, which can save the space. In addition, the flexible printed circuit 450 is electrically connected to the coil 410 for providing a current for the coil 410.

The lens driving device 100 includes a second driving structure 50 for driving the lens module 20 and an elastic bracket 209 for fixing the lens module 20. In particular, a material of the elastic bracket 209 is metal. The elastic bracket 209 is configured for connecting the lens module 20 with the shell 30. The elastic bracket 209 includes four elastic arms, namely a first elastic arm 3091, a fourth elastic arm 3094 distributed on a first diagonal X together with the first elastic arm 3091, a second elastic arm 3092, and a third elastic arm 3093 distributed on a second diagonal Y together with the second elastic arm 3092. On the first diagonal X, the first elastic arm 3091 and the fourth elastic arm 3094 are connected to a support framework 207, and on the second diagonal Y, the second elastic arm 3092 and the third elastic arm 3093 are connected to the shell 30.

The second driving structure 50 is disposed between the support framework 207 and the shell 30. The second driving structure 50 includes a first driving part 501 located on one side edge of the supporting frame 207 and a second driving part 502 located on an adjacent side edge of the support framework 207. The first driving part 501 and the second driving part 502 are located on both sides of the second diagonal Y and provide drive forces in the same direction so that the lens module 20 moves towards a first direction a. It should be noted that the movement of the lens module 20 towards the first direction a is the rotation of the lens module 20 around the first diagonal X. In particular, when the drive force provided by the first driving part 501 and the drive force provided by the second driving part 502 are both in a fourth direction away from the bottom wall 306 in the optical axis direction, the lens module 20 rotates towards the first direction a. When the drive force provided by the first driving part 501 and the drive force provided by the second driving part 502 are both in a fifth direction close to the bottom wall 306 in the optical axis direction, the lens module 20 rotates away from the first direction a. The first driving part 501 and the second driving part 502 provide drive forces in different directions so that the lens module 20 moves towards a second direction b. It should be noted that the movement of the lens module 20 towards the second direction b is the rotation of the lens module 20 around the second diagonal Y. In particular, when the drive force provided by the first driving part 501 is along the fourth direction and the drive force provided by the second driving part 502 is along the fifth direction, the lens module 20 rotates towards the second direction b. When the drive force provided by the first driving part 501 is along the fifth direction and the drive force provided by the second driving part 502 is along the fourth direction, the lens module 20 rotates away from the second direction b.

The second driving structure 50 includes a flipping magnet and a flipping magnet. In some embodiments, a flipping coil includes a first flipping coil 510 and a second flipping coil 550, and the flipping magnet includes a first flipping magnet 520 and a second flipping magnet 560. The first flipping coil 510 is disposed in the first mounting slot 304, and a surface of the first flipping coil 510 away from the lens module 20 is attached to a surface of the first section of the flexible printed circuit 450 close to the lens module 20. The second flipping coil 550 is disposed in the second mounting slot 305, and a surface of the second flipping coil 550 away from the lens module 20 is attached to a surface of the second section of the flexible printed circuit 450 close to the lens module 20. In this way, the mounting space can be reduced. The first flipping magnet 520 and the second flipping magnet 560 are respectively fixedly arranged on the side walls of the shell 30. In some embodiments, the first flipping coil 510 and the second flipping coil 550 are directly disposed on the side walls. A surface of the first flipping magnet 520 close to the lens module 20 directly faces a surface of the first flipping coil 510 away from the lens module 20, and a surface of the second flipping magnet 560 close to the lens module 20 directly faces a surface of the second flipping coil 550 away from the lens module 20. The first flipping magnet 520 interacts with the first flipping coil 510 to generate a first acting force, and the second flipping magnet 560 interacts with the second flipping coil 550 to generate a second acting force. The lens driving device 100 drives the lens module 20 to move towards the first direction and the second direction by means of the cooperation of the first acting force and the second acting force. Image stabilization of the lens module 20 in a biaxial direction is realized.

In the embodiments of the present invention, by means of the cooperation of the second driving structure 50 and the first driving structure 40, flipping of the lens module 20 in a three-axis direction is realized, so that the lens module 20 is subjected to image stabilization compensation in the shell, the three-axis image stabilization is completed, and a clearer imaging effect is achieved. In addition, the rolling of the balls 420 on the arc sections of the rotatable support frameworks guides the flipping of the lens module 20, so that the three-axis image stabilization effect is better.

The second driving structure 50 is provided with a first magnetic yoke 530 and a second magnetic yoke 570. The first magnetic yoke 530 is mounted and fixed on the first mounting slot 304, and a surface of the first magnetic yoke 530 away from the lens module 20 is attached to the first flipping magnet 520. The second magnetic yoke 570 is mounted and fixed on the second mounting slot 305, and a surface of the second magnetic yoke 570 away from the lens module 20 is attached to the second flipping magnet 560. The first magnetic yoke 530 and the second magnetic yoke 570 both have the function of pulling the lens module 20 towards the center of the optical axis.

The second driving structure 50 is further provided with a first steel plate 540 and a second steel plate 580. The first steel plate 540 is arranged in a gap formed between the first section of the flexible printed circuit 450 and the first flipping coil 510, and the second steel plate 580 is arranged in a gap formed between the second section of the flexible printed circuit 450 and the second flipping coil 550. The first steel plate 540 is configured for clamping the first section of the flexible printed circuit 450 to the first flipping coil 510, and the second steel plate 580 is configured for clamping the second section of the flexible printed circuit 450 to the second flipping coil 550.

The lens module 20 includes a lens 201, a lens barrel 208, the housing 70, a lens piece 205, a buckle 203, a sensor 204, a focus module 211, a reset magnet 212, and a second flexible printed circuit 200 which are arranged in sequence along the optical axis. The housing 70 is configured for fixing the lens 201 and the lens barrel 208, and the buckle 203 is configured for suspending the entire lens module 20 in the housing 70. The second flexible printed circuit 200 is configured for supplying power to circuits in the focus module 211. The focus module 211 is configured for focusing the lens 201 in the optical axis direction during the use of the lens 201. The reset magnet 212 is arranged at the bottom of the shell 30 and is configured for, after the lens module 20 is driven to achieve the image stabilization, resetting the balls 420 to their original states for next image stabilization.

The embodiments of the present invention are described above only. It should be noted that those of ordinary skill in the art can further make improvements without departing from the concept of the present invention. These improvements shall all fall within the protection scope of the present invention.

What is claimed is:

1. A lens driving device comprising a housing having an accommodating space and a lens assembly accommodated therein,
    wherein the lens assembly comprises a lens module and a shell for accommodating the lens module; the shell is connected with the housing through a clip;
    an inner surface of a bottom wall of the housing is provided with a first protrusion; an outer surface of a bottom wall of the shell is provided with a second protrusion; the first protrusion and the second protrusion form an arc-shaped rail;
    the lens driving device further comprises a ball disposed between the housing and the shell and located in the arc-shaped rail; a first driving structure for driving the lens assembly to rotate around an optical axis is further arranged between the housing and the shell; and the first driving structure comprises a magnet and a coil.

2. The lens driving device of claim 1, wherein the first driving structure comprises a flexible printed circuit; the coil, the magnet, and the flexible printed circuit are superposed in sequence in a direction perpendicular to the optical axis; the coil is arranged on a surface of the flexible printed circuit away from the housing; the flexible printed circuit is configured for providing a current for the coil; the magnet directly faces a surface of the coil away from the flexible printed circuit; and an electromagnetic acting force is generated between the magnet and the coil so that the lens module rotates around the optical axis.

3. The lens driving device of claim 1, wherein at least four balls are provided, and at least four arc-shaped rails are provided; each of the at least four balls is located in and is capable of rolling in one arc-shaped rail of the at least four arc-shaped rails.

4. The lens driving device of claim 1, wherein the magnet is fixedly arranged on the shell; the magnet comprises a first magnet, a second magnet, and a third magnet which are arranged in sequence in a direction perpendicular to the optical axis; the first magnet, the second magnet, and the third magnet are magnetized along a horizontal direction; a magnetizing direction of the first magnet is opposite to a magnetizing direction of the second magnet; the magnetizing direction of the second magnet is opposite to a magnetizing direction of the third magnet; the coil comprises a first coil opposite to the first magnet, a second coil opposite to the second magnet, and a third coil opposite to the third magnet; a current direction of the first coil is opposite to a current direction of the second coil; and the current direction of the second coil is opposite to a current direction of the third coil.

5. The lens driving device of claim 4, wherein a thickness direction of a winding of the first coil, a thickness direction of the winding of the second coil, and a thickness direction of the winding of the third coil are all perpendicular to the horizontal direction; the first coil, the second coil, and the third coil have a same thickness; a long axis direction of the first coil, a long axis direction of the second coil, and a long axis direction of the third coil are all parallel to a direction of the optical axis.

6. The lens driving device of claim 1, wherein the lens module comprises a lens block and a support framework arranged around the lens block; the lens driving device further comprises an elastic bracket that connects the lens module with the shell, and a second driving structure arranged between the support framework and the shell; the elastic bracket comprises four elastic arms; one pair of elastic arms is connected with the shell on a first diagonal, and the other pair of elastic arms is connected with the support framework on a second diagonal; the second driving structure comprises a first driving part located on one side edge of the support framework and a second driving part located on an adjacent side edge of the support framework; the first driving part and the second driving part are located on two sides of the second diagonal; the first driving part and the second driving part provide drive forces in a same direction so that the lens module move towards a first direction; and the first driving part and the second driving part provide drive forces in different directions so that the lens module move towards a second direction.

7. The lens driving device of claim 6, wherein the shell comprises a first side wall and a second side wall that are adjacently disposed; the first driving part comprises a first flipping magnet fixedly disposed on the first side wall, a second flipping magnet disposed on the second side wall, a first flipping coil opposite to the first flipping magnet, and a second flipping coil opposite to the second flipping magnet.

8. The lens driving device of claim 7, wherein a side wall of the shell is provided with at least three grooves; the magnet comprises at least one magnet; and each magnet of the at least one magnet is accommodated in one groove of the at least three grooves.

9. The lens driving device of claim 8, wherein in a third direction perpendicular to a horizontal direction, a thickness of a magnet of the at least one magnet is less than or equal to a depth of the accommodating groove.

10. An electronic device, having the lens driving device of claim 1.

11. The electronic device of claim 10, wherein the first driving structure comprises a flexible printed circuit; the coil, the magnet, and the flexible printed circuit are superposed in sequence in a direction perpendicular to the optical axis; the coil is arranged on a surface of the flexible printed circuit away from the housing; the flexible printed circuit is configured for providing a current for the coil; the magnet directly faces a surface of the coil away from the flexible printed circuit; and an electromagnetic acting force is generated between the magnet and the coil so that the lens module rotates around the optical axis.

12. The electronic device of claim 10, wherein at least four balls are provided, and at least four arc-shaped rails are provided; each of the at least four balls is located in and is capable of rolling in one arc-shaped rail of the at least four arc-shaped rails.

13. The electronic device of claim 10, wherein the magnet is fixedly arranged on the shell; the magnet comprises a first magnet, a second magnet, and a third magnet which are arranged in sequence in a direction perpendicular to the optical axis; the first magnet, the second magnet, and the third magnet are magnetized along a horizontal direction; a magnetizing direction of the first magnet is opposite to a magnetizing direction of the second magnet; the magnetizing direction of the second magnet is opposite to a magnetizing direction of the third magnet; the coil comprises a first coil opposite to the first magnet, a second coil opposite to the second magnet, and a third coil opposite to the third magnet; a current direction of the first coil is opposite to a current direction of the second coil; and the current direction of the second coil is opposite to a current direction of the third coil.

14. The electronic device of claim 13, wherein a thickness direction of a winding of the first coil, a thickness direction of the winding of the second coil, and a thickness direction of the winding of the third coil are all perpendicular to the horizontal direction; the first coil, the second coil, and the third coil have a same thickness; a long axis direction of the first coil, a long axis direction of the second coil, and a long axis direction of the third coil are all parallel to a direction of the optical axis.

15. The electronic device of claim 10, wherein the lens module comprises a lens block and a support framework arranged around the lens block; the lens driving device further comprises an elastic bracket that connects the lens module with the shell, and a second driving structure arranged between the support framework and the shell; the elastic bracket comprises four elastic arms; one pair of elastic arms is connected with the shell on a first diagonal, and the other pair of elastic arms is connected with the support framework on a second diagonal; the second driving structure comprises a first driving part located on one side edge of the support framework and a second driving part located on an adjacent side edge of the support framework; the first driving part and the second driving part are located on two sides of the second diagonal; the first driving part and the second driving part provide drive forces in a same direction so that the lens module move towards a first direction; and the first driving part and the second driving part provide drive forces in different directions so that the lens module move towards a second direction.

16. The electronic device of claim 15, wherein the shell comprises a first side wall and a second side wall that are adjacently disposed; the first driving part comprises a first flipping magnet fixedly disposed on the first side wall, a second flipping magnet disposed on the second side wall, a first flipping coil opposite to the first flipping magnet, and a second flipping coil opposite to the second flipping magnet.

17. The electronic device of claim 16, wherein a side wall of the shell is provided with at least three grooves; the magnet comprises at least one magnet; and each magnet of the at least one magnets is accommodated in one groove of the at least three grooves.

18. The electronic device of claim 17, wherein in a third direction perpendicular to a horizontal direction, a thickness of a magnet of the at least one magnet is less than or equal to a depth of the accommodating groove.

\* \* \* \* \*